H. G. VOIGHT.
CASEMENT ADJUSTER.
APPLICATION FILED AUG. 1, 1919.
1,326,623.
Patented Dec. 30, 1919.
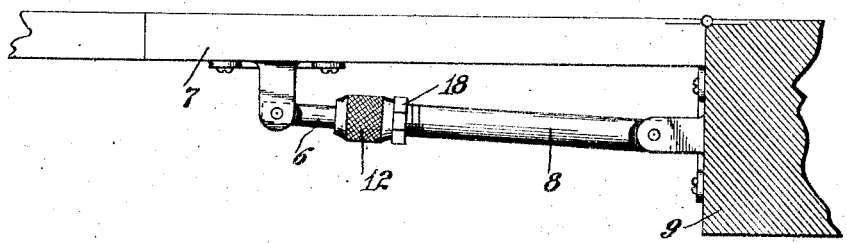
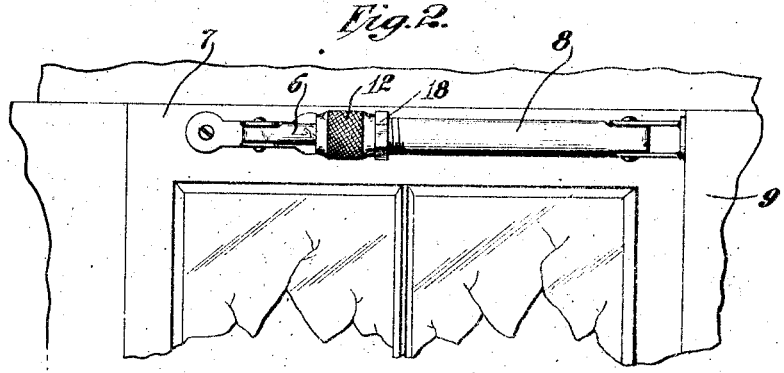
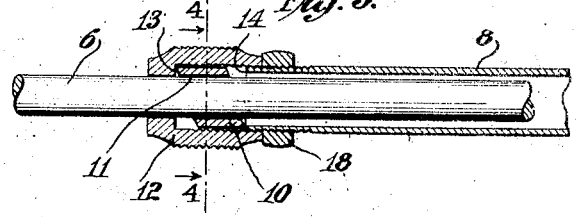
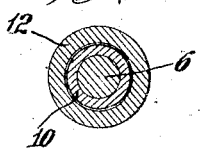
INVENTOR
H. G. Voight

UNITED STATES PATENT OFFICE.

HENRY G. VOIGHT, OF NEW HAVEN, CONNECTICUT.

CASEMENT-ADJUSTER.

1,326,623. Specification of Letters Patent. Patented Dec. 30, 1919.

Application filed August 1, 1919. Serial No. 314,703.

*To all whom it may concern:*

Be it known that I, HENRY G. VOIGHT, a citizen of the United States of America, residing at New Haven, Connecticut, have invented a new and useful Casement-Adjuster, of which the following is a specification.

My invention relates particularly to a friction device for holding a movable part in different adjusted positions with relation to a relatively stationary part and I have illustrated the invention as applied to a casement adjuster.

The main object of the invention is to provide a simple and inexpensive form of device which may be readily adjusted to afford varying degrees of resistance to movement and which is durable and which will not scratch or mar the extensible elements.

In its simplest form the principal elements of the invention comprise two relatively telescopic members with a special friction device surrounding the inner member and clamped with relation to it by means of a device which serves also as a housing therefor.

Figure 1, is a plan view and partial section showing the invention as applied to a casement adjuster.

Fig. 2, is a fragmentary front view of the same.

Fig. 3, is an enlarged fragmentary view showing the principal elements of a construction embodying my invention, the parts being shown in longitudinal section.

Fig. 4, is a section on the plane of the line 4—4 of Fig. 3.

Fig. 5 is a side view of the clamping element.

Fig. 6, shows a modified form of gripping member.

Fig. 7, is a detail view showing two gripping members.

In the form shown the rod 6 is hinged to the swinging member 7. The tube 8 is hinged to the relatively stationary part 9.

The clamping member 10 is preferably formed of a non-metallic substance such as relatively hard fiber with a longitudinal passage 11 permitting the device to be readily slipped on the rod 6.

The member 12 is interiorly threaded at one end so as to screw onto the outer end of the tube 8. The other end has a passage for the rod 6 and is provided with a shoulder 13 to engage one end of the member 10. The outer end of the tube 8 has an oppositely facing shoulder 14 for engagement with the opposite end of the member 10. One or each of the ends of the member 10 is off-set from the main body or beveled as at 15 and 16 so that when the member 12 is screwed on to the end of the tube 8, the clamping member 10 is caught between the pressure of the shoulders 13 and 14 and tilted so as to frictionally grip the surface of the rod 6. By tightening up on the member 12 more or less, greater or less friction may be produced and consequently greater or less resistance to movement of the rod 6 relative to the tube 8. In fact it is possible to grip the parts so as to entirely prevent relative movement by the exercise of ordinary pressure. A clamp nut 18 may be provided if desired to prevent the member 12 from working loose, ordinarily however, this is not required as the friction produced by the member 10 is sufficient to prevent accidental displacement.

The member 10 may be split as indicated at 17 in which case it will be more readily deformable. Such expedient may be used when the material is hard—for instance if metal is used.

Two members 10ª and 10ᵇ may be used as indicated in Fig. 7, one bearing against the other so as to increase the gripping effect.

Although the device shown is applied to a casement adjuster, it will be apparent that the essential elements of the invention are applicable to many other uses where a friction device of this character is required.

I claim:—

1. An extensible member comprising, two telescopi members, an adjustable member having a screw threaded connection with the outer member and a distortable hard fiber gripping member mounted on the inner member between the end of the outer member and the end of the adjustable member and arranged to be distorted by the endwise pressure of the parts between which it is confined.

2. An extensible member comprising, two telescopic embers, an adjustable member having a screw threaded connection with the outer member and a distortable hard fiber gripping member beveled on one end and arranged on the inner member between the end of the outer member and the end of the adjustable member.

3. An extensible member comprising, two telescopic members, an adjustable member having a screw threaded connection with the outer member and a distortable hard fiber gripping member beveled on both ends and arranged on the inner member between the end of the outer member and the end of the adjustable member.

4. An extensible member comprising, two telescopic members, an adjustable member having a screw threaded connection with the outer member, a gripping member arranged on the inner member between the end of the outer member and the end of the adjustable member, one of the end faces being inclined relative to the end face coacting therewith.

5. An extensible member comprising, two telescopic members, an adjustable member having a screw threaded connection with the outer member and a friction member mounted on the inner member between the end of the outer member and the end of the adjustable member and constructed to be tilted by the endwise pressure thereon of the parts between which it is confined.

6. An extensible member comprising, two telescopic members, an adjustable member having a screw threaded connection with the outer member and a tilting non-metallic gripping member arranged on the inner member between the end of the outer member and the end of the adjustable member.

HENRY G. VOIGHT.